UNITED STATES PATENT OFFICE.

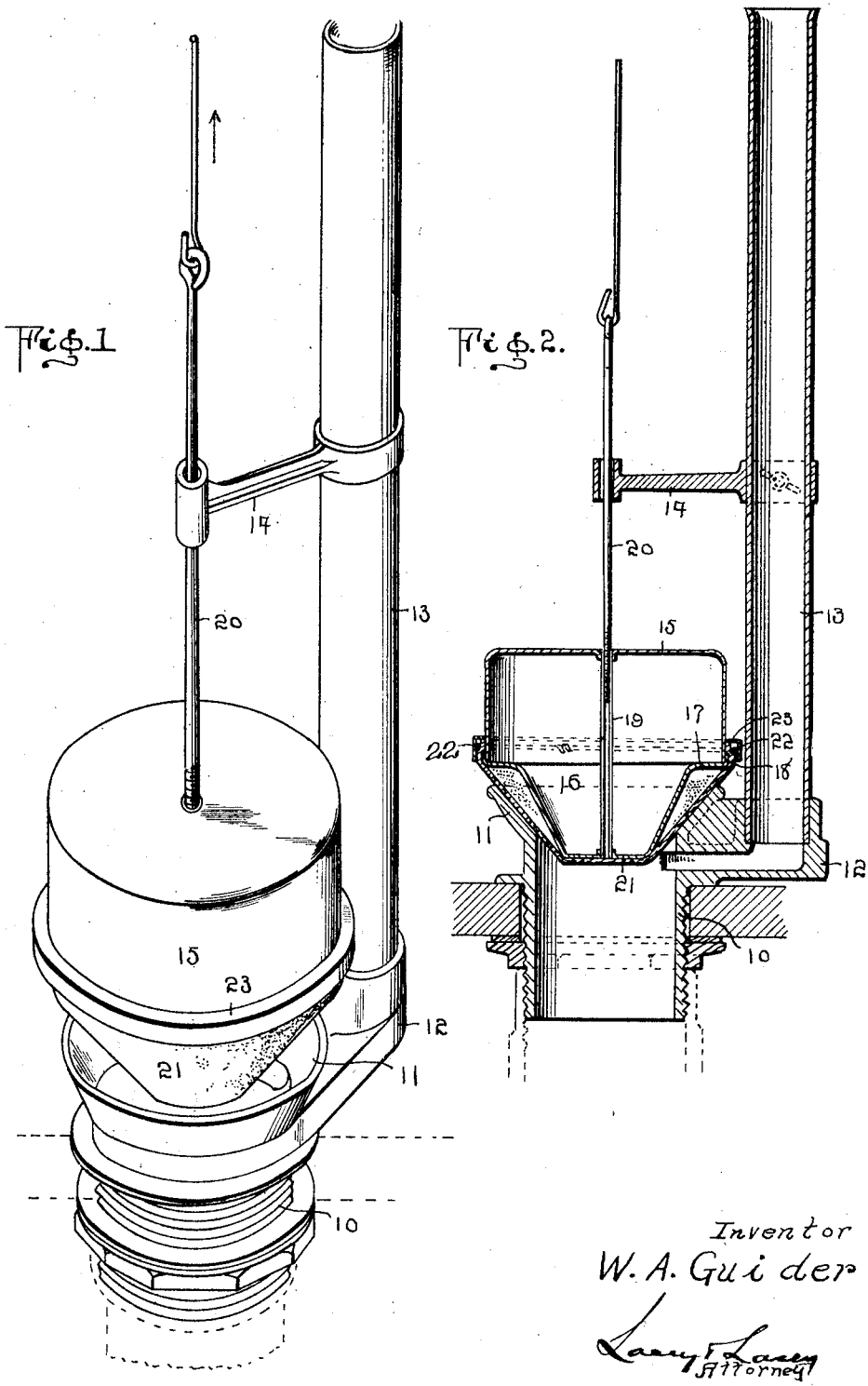

WALTER A. GUIDER, OF LINDEN HEIGHTS, OHIO.

FLOAT-VALVE.

1,318,989. Specification of Letters Patent. Patented Oct. 14, 1919.

Application filed January 18, 1919. Serial No. 271,865.

*To all whom it may concern:*

Be it known that I, WALTER A. GUIDER, a citizen of the United States, residing at Linden Heights, in the county of Franklin and State of Ohio, have invented certain new and useful Improvements in Float-Valves, of which the following is a specification.

This invention relates to an improved float valve for closet tanks.

As is well known, a rubber float valve is now commonly used and the most prevalent type of flush valve employs a waste pipe upstanding from the outlet pipe or valve nipple in close proximity to the valve seat so that when the float valve is lifted and then again moves to engage its seat, said float valve must travel in a path parallel to the waste pipe. After being in use a relatively short time, the rubber float valve swells and becomes sufficiently enlarged to contact with the waste pipe so that constant trouble is experienced by sticking or wedging of the float valve against the pipe and consequent failure of the valve to shift into engagement with its seat. The present invention, therefore, has as its primary object to provide a float valve so constructed that these difficulties will be overcome.

The invention has as a further object to provide a float valve the body of which will be formed of metal so that the valve cannot swell while, at the same time, the valve will be equipped with a suitable seating hood adapted to engage the seat of the outlet pipe to provide a closed joint at said seat.

And the invention has as a still further object to provide a construction wherein a flexible hood will be employed and wherein said hood will be stretched over the body of the float valve in such manner that when the valve is moved to engage the valve seat, the hood may flex to yieldably conform to the seat so as to provide a watertight joint between the float valve and outlet pipe.

Other and incidental objects will appear during the course of the detailed description of the invention. In the drawings, wherein I have illustrated the preferred embodiment of the invention, and wherein similar reference characters designate corresponding parts throughout the several views:

Figure 1 is a perspective view showing my improved float valve in connection with an outlet pipe of conventional type, and Fig. 2 is a vertical sectional view more particularly illustrating the details of construction of the float valve.

Referring now more particularly to the drawings, I have shown my improved float valve in connection with a conventional type of outlet pipe or valve nipple 10 flared at its upper end to provide a valve seat 11. As is usual, a lateral hollow extension 12 projects from the pipe and upstanding from this extension is a waste pipe 13 carrying a guide arm 14.

Coming now more particularly to the subject of the present invention, I employ a substantially cylindrical valve body which is formed of an upper cylindrical section 15 and a lower substantially frustoconical section 16. The valve body is hollow and is formed of metal so that said body cannot swell. As particularly shown in Fig. 2 of the drawings, the section 16 of the valve body is contracted somewhat, the tapered portion of said section being of less diameter at its base than the diameter of the section 15 of the body. Extending from the base of said tapered portion of the section 16 is a radial rim 17 from which projects an annular flange 18 snugly fitting over the lower open end of the section 15 of the body and being soldered or otherwise secured thereto for firmly connecting the sections. Extending through the valve body axially thereof is a sleeve 19 soldered or otherwise connected at its ends to the valve sections and threaded at its lower end into the upper end of this sleeve is a valve stem 20 slidably fitting through the sleeve to the guide arm 14.

Fitted over the tapered lower end of the valve body is a flexible seating hood 21 which may be formed of leather or other approved material. At its margin, this hood is engaged over the flange 18 of the section 16 of the valve body and securing the hood immediately above the flange is a clamping element 22. This clamping element may be formed from a length of suitable wire engaged around the valve body and having its ends twisted together for firmly binding the hood upon the valve body. In this connection it is to be particularly noted that the flange 18 provides an annular shoulder upon the valve body and since the clamping element 22 surrounds the margin of the hood immediately above this shoulder, the hood will be held to engage over the shoulder while downward displacement of the clamping element as well as slipping of the margin of the hood will be prevented by the shoulder. However, should it become necessary to renew the hood, the worn hood may be readily removed by simply displacing the clamping element when a new hood may be easily applied and secured in position. Slidably fitting over the valve body is an angle shaped guard ring or collar 23 for the upper margin of the hood. As particularly shown in Fig. 2, this ring incloses the hood at its upper edge and overlies the clamping element 22. Thus, it will be seen that contact of the hood with the waste pipe 13 to cause sticking or wedging of the valve against said pipe when the valve is moved vertically, will be prevented, since the guard ring will always present a smooth surface to the waste pipe. Futhermore, since the valve body cannot swell, interference between the valve body and waste pipe will be entirely eliminated and the trouble at present experienced by sticking of the float valve overcome.

As will now be observed, the seating hood 21 is stretched over the reduced lower end of the valve body and extends from the smaller truncated end of the conical portion of the lower section of the body to the lower end of the upper section in spaced relation to the intervening portion of the wall of the lower section. The hood is thus supported to assume a frusto conical shape so that when the valve is closed and the smaller end of the valve body is projected into the upper end of the pipe 10, the hood will engage the valve seat 11 for closing the outlet. As will be clear, the sloping wall of the hood will act to center the valve with respect to the valve seat. Further, particular attention is directed to the fact in this connection that when the valve is closed, the free side wall of the hood will contact the valve seat. In other words, the side wall of the hood, being supported to extend in spaced relation to the side wall of the tapered portion of the section 16 of the valve body, will be free to flex inwardly when engaged with the valve seat so that said wall of the hood will thus snugly conform to the seat to provide a watertight joint between the valve and seat. I accordingly provide a valve which will effectually cut off the flow through the outlet pipe while, at the same time, the valve will always properly move to closed position.

Having thus described the invention, what is claimed as new is:

1. A float valve including a valve body, and a seating hood carried by the valve body and having a flexible non-resilient seat engaging portion extending in spaced relation to the valve body.

2. A float valve including a valve body provided with a reduced lower end portion, a seating hood stretched over the reduced lower end of the valve body and connected at its free margin with the upper end portion thereof, and a guard collar removably fitted over the upper end portion of the valve body to surround the valve body and overlie the free margin of said seating hood.

3. A float valve including a valve body comprising an upper section and a reduced lower section having a flange connecting the lower section with the upper section, a seating hood stretched over the lower section of the valve body and at its free margin engaging over said flange, clamping means surrounding the free margin of the hood above said flange and held against downward displacement by the flange, and guard means for the hood overlying the free margin thereof as well as said clamping means.

4. In a float valve, the combination with a rigid valve body, of a flexible non-resilient seating hood carried by the valve body for engagement with a valve seat.

5. In a float valve, the combination with a valve body provided with a reduced lower end portion, of a flexible non-resilient seating element stretched over the reduced lower end portion of the valve body and connected at its free margin with the upper end portion of the valve body.

In testimony whereof I affix my signature.

WALTER A. GUIDER. [L. S.]